Oct. 29, 1968

M. M. McWHORTER 3,408,602

SHIELDED SWITCHING DEVICE

Filed April 12, 1967

3 Sheets-Sheet 1

INVENTOR.
MALCOM M. McWHORTER
BY Flehr, Hohbach, Test, Albritton & Herbert
ATTORNEYS INVENTOR.
MALCOM M. McWHORTER
BY Fleit, Hohbach, Test, Albritton & Herbert
ATTORNEYS INVENTOR.
MALCOM M. McWHORTER
BY Flehr, Hohbach, Test, Albritton & Herbert
ATTORNEYS

United States Patent Office 3,408,602

Patented Oct. 29, 1968

3,408,602

SHIELDED SWITCHING DEVICE

Malcolm M. McWhorter, Menlo Park, Calif., assignor to Vidar Corporation, Mountain View, Calif., a corporation of California Filed Apr. 12, 1967, Ser. No. 630,385

4 Claims. (Cl. 335—112)

ABSTRACT OF THE DISCLOSURE

A switching device with leaf switches in groups of three are mounted in cutouts in a printed circuit board. Each switch group is associated with a voltage or current source which is selectively switched to a common output. Printed circuitry associated with one of the three switches is a guard conductor and the remaining circuitry, data conductors. Such data circuitry of each switch is isolated from each other by proper arrangement of the guard conductor on the board. Metal plates on each side of the board provide isothermal planes.

This invention relates generally to a shielded switching device and more particularly to a switching device using printed circuits.

Measurement of low level signals which may be associated with high level circuits has brought the necessity of a switching device which will preserve the character of the desired low-level signal. Naturally, the distributed characeristics of the switching circuit and small values of internal conductance, direct and mutual capacitance become sigfinificant at these low-level signals. These effects must be either balanced or eliminated.

Finally, minor effects due to heat such as the Seebeck Effect may produce unwanted potentials of the same magnitude as the operating voltages of the circuit.

It is a general object of the present invention to provide a shielded switching device which minimizes the foregoing circuit problems.

It is another object of the invention to provide a device of the above character which is compact.

It is a further object of the present invention to provide a switching device using printed circuits in which circuits associated with each switch are effectively isolated from one another in a simple and economical manner.

It is still another object of the invention to provide a switching device in which the Seebeck Effect is minimized.

In accordance with the above objects a shielded switching device for selectively switching one of a plurality of input channels to a common output channel is provided. Each of the input channels has a guard conductor with a voltage potential related to the local ground of that particular channel and at least two data carrying conductors. The output channel also has a guard conductor and at least two data carrying conductors. The switching device comprises a substantially planar printed circuit board having a plurality of switches lying substantially in a plane for selectively switching the input channels to the output channel. Each of the switches has a first set of contacts on an input side of the switches coupled by a printed circuit on the board to both the guard conductor and data conductors of the output channel. Means for electrically isolating the printed circuits of a closed switch which are associated with data conductors from the printed circuits associated with both the guard conductor and data conductors of the other open switches are provided and include a plurality of input strip conductors individually coupled to the guard conductors of the switches and printed on the circuit board. Each input strip conductor extends alongside one of the data conductors of the switch with which it is associated whereby the data conductor is shielded from adjacent input printed circuits of other switches. By shielded it is meant that both the mutual capacitance coupling and leakage conductance are to a large degree eliminated. The input strip conductor terminates on the input side of the switches. Output strip conductors are provided which are coupled to the output guard conductor and printed on the circuit board and extend alongside one of the conductors of the next adjacent switch and terminate in spaced juxtaposition with the termination of an input strip conductor.

Isothermal planes in the form of metal plates, for example, may also be provided in juxtaposition with the sides of the circuit board to minimize the Seebeck Effect. Thus the shielding of the selected channel comprises the top and bottom metal planes and the guard conductors between the desired and undesired channels.

The foregoing and other objects of the invention will become more clearly apparent from the following description when taken in conjunction with the accompanying drawings.

Referring to the drawings.

Figure 1:
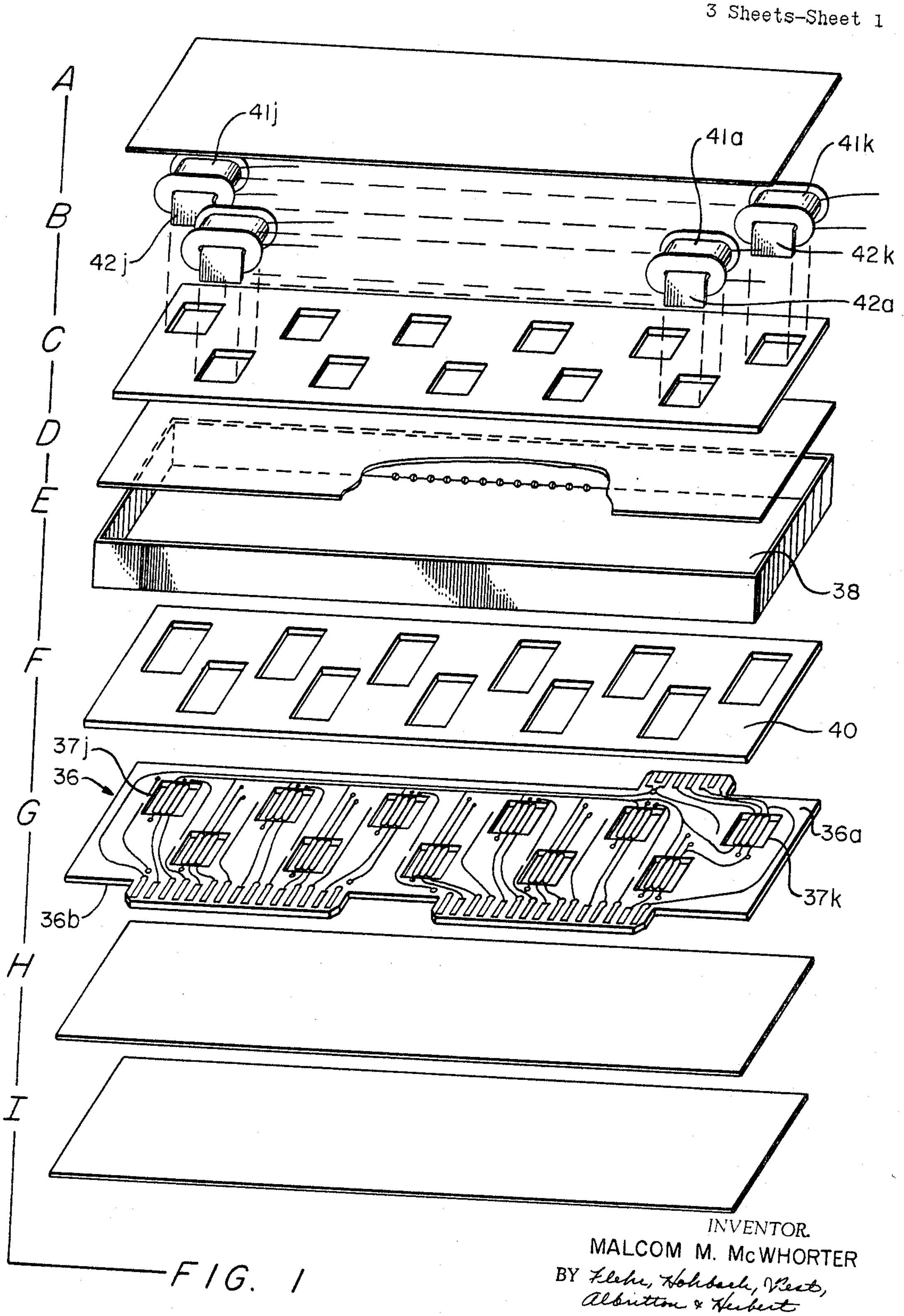
FIGURE 1 is an exploded perspective view of the switching device of the present invention.

The shielded switching device of the present invention selectively switches one of a plurality of input channels **11*a*–11*j* (FIGURE 5) to a common output channel 12 which is coupled to a utilization device 13. The input channels 11 originate at voltage or current sources as for example transducers 14*a* and 14*j*. Transducer 14*a* has a local ground "1" and transducer 14*j* has a local ground "2" which may be at a different potential than ground "1." Each input channel consists of two data conductors 17 and 18 and a guard conductor 19 which are respectively coupled to the two output terminals of the transducer and its local ground. A shielded switching device or scanner 21 selectively switches input channels 11*a*–11*j* to the utilization device 13 through switches 28*a*–28*j* and a treeing switch 22 which is in series with the output channel of the scanner. Switch 22 has three conductors; namely, two data carrying conductors 24 and 25 and a guard conductor 26 to which the data carrying and guard conductors of the input channels are coupled in parallel. The purpose of treeing switch 22 is to isolate the scanner 21** from other scanner devices which may also be coupled to the same utilization device.

In some applications the treeing switch 22 is not necessary and the conductors are directly coupled to the utilization device. The guard conductor 26 is connected to the local scanner shields shown in FIGURES 1E and 1I and indicated as ground "4." Conductor 26 is terminated on an inner shield **13*a* of utilization device 13. In addition, to prevent common mode voltages from modulating the signal received on the data carrying conductor, device 13 has an outer shield 13*b*** which is coupled to a local ground "3." Fuller discusses shielding in this manner in Patent No. 3,204,201 by G. S. Bahrs entitled "Shielded Circuit" issued Aug. 31, 1965 and assigned to the present assignee.

Figure 6:
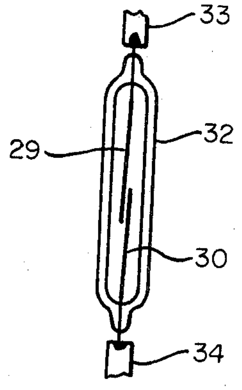
FIGURE 6 is an enlarged cross-sectional view of one of the switches used in the present invention.

As discussed above, input channels **11*a*–11*j* are selectively coupled to the switch 22, if used, and the output channel by a plurality of switches 28*a*–28*j*. These switches along with switch 22 have three pairs of contacts. Each pair may be of the reed switch type as illustrated in FIGURE 6 where contacts 29 and 30 are metal leaves enclosed in a glass envelope 32 which is evacuated. Contacts 29 and 30 are terminated on printed circuit conductors 33 and 34** by soldering or other suitable means.

The shielded switching device itself is illustrated in FIGURES 1A through 1I which are exploded views of the different components. The basic components of the circuit are the printed circuit board, FIGURE 1G, which will be explained in greater detail below in conjunction with FIGURES 2 and 3 and the shielding planes, FIGURES 1E and 1I. The envelopes of switches 28*a*–28*j* and 22 are grouped in threes in rectangular cutouts 37*a*–37*k* on the plastic or dielectric board 36 and are soldered to conductors carried on the top surface 36*a* of the board. They extend slightly above the surface. A dielectric spacer 40 (FIGURE 1F) has mating cutouts to accommodate the raised envelopes so that the two sheets may be then abutted against a metal box (FIGURE 1E) without damaging the switch. The bottom 38 of the box abuts against the spacer 40 and serves as an isothermal and electrostatic shielding plane. Similarly, on the reverse side 36*b* of the board 36 a dielectric layer (FIGURE 1H) abuts directly against the board and a second metal isothermal and electrostatic shielding plane (FIGURE 1I) abuts against the dielectric layer.

Switches 28*a*–28*j* and 22 are actuated in a manner well known in the art by coils 41*a*–41*k* having U shaped cores 42*a*–42*k* which are inserted in the cutouts of FIGURE 1C to match the cutouts 37 of FIGURE 1G. A dielectric buffer layer (FIGURE 1D) isolates the cores 42 from the metal bottom 38. The box (FIGURE 1E) is closed by a metal top (FIGURE 1A). The components of FIGURE 1 are shown assembled in FIGURE 4 with the input and output printed circuit terminals as indicated.

Figures 2, 3, 4:
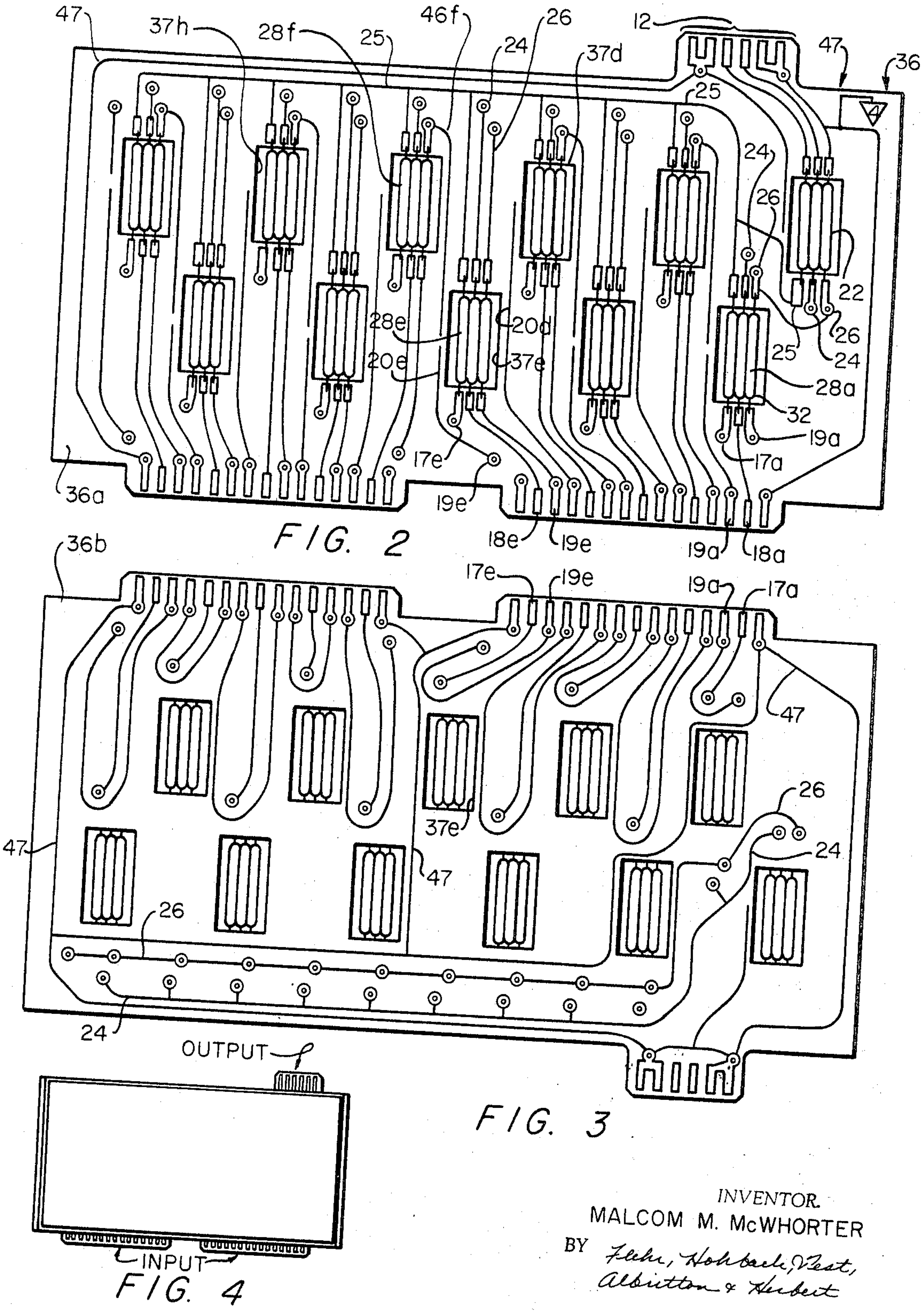
FIGURES 2 and 3 are plan views of the front and back sides of the printed circuit shown in FIGURE 1.
FIGURE 4 is a plan view of the components of FIGURE 1 in assembled form.

In discusing the novel apparatus of the present invention a typical switch 28*e* located in cutout 37*e* will be used along with its associated input and output printed circuitry. More specifically, switch 28*e* includes input printed circuitry which consists of data conductors 17*e* and 18*e* and a guard conductor 19*e*. Guard conductor 19*e* electrically isolates the input data conductor 18*e* from the input printed circuits of the next adjacent switch to the right. In addition, as shown in FIGURE 3, the data conductor 17*e*, which is on the reverse side, 36*b* of the printed circuit board, is isolated from adjacent printed circuits to both its left and right by the encirclement of the guard conductor 19*e* around it.

In accordance with the invention, the data conductor printed circuits 17*e* and 18*e* on the 36*a* side of the printed circuit board are electrically isolated from the input printed circuit of switch 28*f* by an input strip conductor 20*e* which is coupled to guard conductor 19*e*. This strip conductor 20*e* extends alongside of the data conductors 18*e* and 17*e* and terminates at approximately the middle portion of switch 28*e*. In any case, conductor 20*e* must terminate before the output portion of switch 28*e* since otherwise unwanted potentials might appear on the output circuits when switch 28*e* is open.

Figure 5:
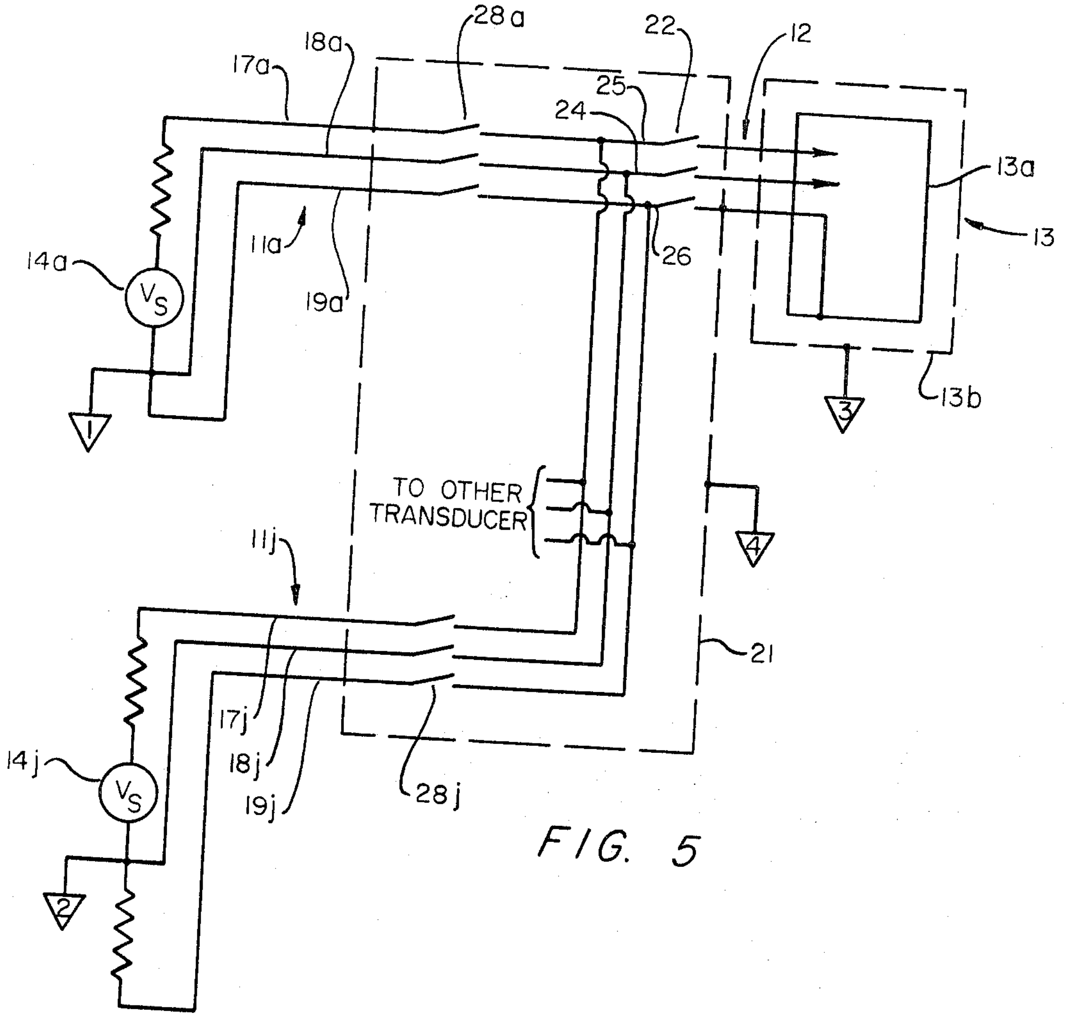
FIGURE 5 is a schematic circuit showing the shielded switching device of the present invention as it would couple typical transducer voltage or current sources to a utilization device.

Electrical isolation or shielding is accomplished with regard to the printed circuits on the output side of switch 28*e* by the output guard printed circuit 26 which provides shielding with respect to other printed circuits on the right side. The data conductors 25 and 24 of switch 28*e* are isolated from the input side of switch 28*f* by an output strip conductor 46*f* which is coupled to the output guard terminal 26 of that switch. Output strip conductor 46*f* extends along one side of the data conductors 24 and 25 of switch 28*e* and terminates in spaced juxtaposition to input strip conductor 20*e* leaving only a small gap which is spaced opposite switch 28*e*. As shown in FIGURE 5, all of the output terminals 24, 25 and 26 of the switches are tied together to form three lines. If only switch 28*e* is activated, all of the output guard conductors 26 of the respective switches will be at the potential of the output guard conductor of switch 28*e*. Thus the output strip conductor 46*f* will be at the same potential as the input strip conductor 20*e* to shield the output printed circuits of the switch from the next adjacent input printed circuitry of switch 28*f*.

Because of the staggering of the switches 28, only every other switch requires an output strip conductor protector 46. Every other input strip conductor 20, as for example 20*d*, extends into the output printed circuit area of switches 28 but does not have any effect since it is adjacent to the guard conductor 26.

Thus in summary, the input and output circuit conductors 20 and 46 along with the respective guard conductors of the switches serve to electrically isolate both the input and output printed circuits of an active switch from the potentials which may appear on either the guard conductors or the data conductors of the next adjacent switches. This protection extends to the input connectors for input data conductors 17*a*–17*e* and 18*a*–18*e* which are surrounded by guard conductors on both the front and back sides of the printed circuit board.

For additional protection, the entire printed circuit board 36 is surrounded by a local ground conductor 47 which is coupled to the output guard conductor contact of treeing switch 22 and circles around the periphery of the board on both the front side 36*a* and reverse side 36*b* except for the input and output terminal strips. This guard conductor is also connected to shielding planes, FIGURE 1E and FIGURE 1I, indicated at ground "4."

The significant characteristic of the circuit which the shielding protects against is the surface conductivity between different channels of the switching circuit. For example, a thin layer of oxide or dampness may form on the circuit board 36 and cause some leakage across its surface. Interchannel capacitance is also eliminated by the guard conductor arrangement because of the strip line character of the data lines interleaved by the guard conductors.

As discussed above, because of the small operating currents and voltages of the circuit the Seebeck Effect (which is a potential generated by a circuit junction of two dissimilar metals) must be eliminated. This effect is most pronounced where the switch leaves 29 and 30 of switches 28 terminate on printed metal circuitry of a dissimilar type as illustrated in FIGURE 6. In accordance with the invention an effective isothermal plane is provided by metal plates extending along the top and the bottom of the circuit board as illustrated in FIGURES 1I and 1E. This equalizes the temperature between the dissimilar metal junctions and because of the dual data conductors 17 and 18 any potentials generated balance each other out.

Thus, the present invention provides an improved shielded switching device which minimizes internal leakage resistance and capacitance and effectively electrically isolates one channel from another in a simple and economical manner. Moreover the device is relatively compact because of the foregoing printed circuit arrangement. Lastly the Seebeck Effect is minimized.

What is claimed is:

1. A shielded switching device for selectively switching one of a plurality of input channels to a common output channel, each of said input channels having a guard conductor with a voltage potential related to the local ground of that particular channel and at least two data carrying conductors said output channel also having a guard conductor and at least two data carrying conductors, the switching device comprising: a substantially planar printed circuit board having a plurality of switches lying substantially in such plane for selectively switching said input channels to said output channel, each of said switches having a first set of contacts on an input side of the switches coupled by a printed circuit on said board to both the guard conductor and data conductors of a corresponding input channel and each of said switches having a second set of contacts on an output side of the switches coupled in parallel on a printed circuit on said board to both the guard conductor and data conductors of said output channel; means for electrically isolating the printed circuits of a closed switch, which are associated with data conductors, from the printed circuits associated with both the guard conductor and data conductors of the other open switches including, a plurality of input strip conductors individually coupled to the guard conductors of said switches and printed on said circuit board and extending alongside one of said data conductors of the switch with which it is associate whereby such data conductor is shielded from adjacent input printed circuits of other switches, said input strip conductor terminating on the input side of said switches, and output strip conductors coupled to said output guard conductor and printed on said circuit board and extending alongside one of the conductors of the next adjacent switch and terminating in spaced juxtaposition with the termination of an input strip conductor.

2. A shielded switching device as in claim 1 where an isothermal plane is provided in juxtaposition with at least one side of said printed circuit board.

3. A shielded switching device as in claim 1 where one of said input data conductors is printed substantially on an opposite side of said board as the other data conductor, said one data conductor being substantially encircled by a corresponding guard conductor.

4. A shielded switching device as in claim 1 in which said switches are located on said board in a staggered line.

References Cited

UNITED STATES PATENTS

| | | | |
|---|---|---|---|
| 3,061,760 | 10/1962 | Ezzo | 317—101 |
| 3,193,731 | 7/1965 | Gerlach | 335—199 |
| 3,293,502 | 12/1966 | Beierle | 335—152 |

BERNARD A. GILHEANY, *Primary Examiner.*

H. BROOME, *Assistant Examiner.*